US United States Patent Office 3,231,334
Patented Jan. 25, 1966

3,231,334
PROCESS FOR RECOVERY OF BORON HALIDES
Anthony J. Guarnaccio, Niles, Ill., assignor to Universal Oil Products Company, Des Plaines, Ill., a corporation of Delaware
No Drawing. Filed July 16, 1962, Ser. No. 210,247
17 Claims. (Cl. 23—205)

This invention relates to a process for the separation and recovery of a boron halide from a fluid mixture, and more particularly relates to a process for the separation and recovery of a boron halide utilizing a boron halide sorbent. Still more particularly, this invention relates to a process for the separation and recovery of a boron halide from a fluid mixture with a boron halide sorbent comprising a substituted organic sulfoxide thereby sorbing at least a portion of said boron halide with said sorbent, and subsequently recovering boron halide from said process.

The term "sorption" means a mechanism by which at least one component of a mixture selectively combines in some form with the medium with which the mixture is contacted; such mechanisms may be adsorption, absorption, clathration, occlusion or chemical reaction, and all these mechanisms are generically designated herein as "sorption."

It has been found that in the production of alkylated aromatic hydrocarbons utilizing a boron trifluoride-modified substantially inorganic oxide, alkylatable aromatic hydrocarbon, olefin-acting compound, and boron trifluoride, free boron fluoride will usually be found among the liquid hydrocarbon reaction products and unreactive off-gas. The recovery and reuse of the boron fluoride, therefore, results in extraordinary economy of operation.

The principal object of the present invention is to provide a process for the efficient and economical separation and recovery of the boron fluoride from a fluid mixture. Another object of this invention is to provide a process whereby the boron halide can be separated continuously from the hereinbefore mentioned hydrocarbon reaction products without appreciable consumption and loss of the recovered boron halide. Another object of this invention is to provide a process whereby the boron halide can be separated continuously from the hereinabove mentioned fluid mixtures without appreciable consumption or loss of the recovered boron fluoride-free fluid. Other objects of this invention will be set forth hereinafter as part of the specification and in the accompanying examples.

In one embodiment, the present invention relates to a process for the separation and recovery of a boron halide from a fluid mixture containing the same which comprises contacting said fluid mixture with a boron halide sorbent comprising a substituted organic sulfoxide, in a sorption zone at sorption conditions, sorbing at least a portion of said boron halide with said sorbent, and subsequently recovering boron halide from said process.

Another embodiment of the present invention relates to a process for the separation and recovery of boron fluoride from a fluid mixture containing the same which comprises contacting said fluid mixture with a boron fluoride sorbent comprising a substituted organic sulfoxide, in a sorption zone at sorption conditions including a temperature of from about —50° to about +300° C. and a pressure of from about atmospheric to about 200 atmospheres, sorbing at least a portion of said boron fluoride with said sorbent, and subsequently recovering boron fluoride from said process.

A specific embodiment of the present invention relates to a process for the separation and recovery of boron fluoride from a refinery off-gas containing the same which comprises contacting said off-gas with a boron fluoride sorbent comprising dimethyl sulfoxide, in a sorption zone at sorption conditions including a temperature of from about —50° to about +300° C. and a pressure of from about atmospheric to about 200 atmospheres, sorbing at least a portion of said boron fluoride with said sorbent, and subsequently separately recovering boron fluoride and refinery off-gas from said process.

A further specific embodiment of the present invention relates to a process for the separation and recovery of boron fluoride from benzene containing the same which comprises contacting said benzene with a boron fluoride sorbent comprising dimethyl sulfoxide, in a sorption zone at sorption conditions including a temperature of from about —50° to about +300° C. and a pressure of from about atmospheric to about 200 atmospheres, sorbing at least a portion of said boron fluoride with said sorbent, and subsequently separately recovering boron fluoride and benzene from said process.

Other embodiments of the present invention will become apparent in considering the specification as hereinafter set forth.

As set forth hereinabove, the present invention relates to a process for the separation and recovery of a boron halide from a fluid mixture utilizing a boron halide sorbent comprising a substituted organic sulfoxide as the sorption agent. Some suitable specific sulfoxides of the general formula

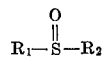

wherein the $R_1$ and $R_2$ are organic radicals which are not linked together, are the hydrocarbon substituted sulfoxides selected from the group consisting of: dialkyl, dialkenyl, alkyl alkenyl, dialicyclic, alkyclic, alkenyl alicyclic, diaryl, alkyl, aryl, alkenyl, aryl, and alicyclic aryl, sulfoxides, Typical dialkyl sulfoxides include dimethyl sulfoxide, diethyl sulfoxide, dipropyl sulfoxide, etc.; typical dialkenyl sulfoxides include divinyl sulfoxide, diallyl sulfoxide, dicrotonyl sulfoxide, dimethallyl sulfoxide, etc.; typical alkyl alkenyl sulfoxides include methyl vinyl sulfoxide, ethyl vinyl sulfoxide, propyl vinyl sulfoxide, methyl allyl sulfoxide, ethyl allyl sulfoxide, propyl allyl sulfoxide, etc.; typical alicyclic sulfoxides include dicyclopentyl sulfoxide, dicyclohexyl sulfoxide, etc.; typical alkyl alicyclic sulfoxides include methyl cyclopentyl sulfoxide, ethyl cyclopentyl sulfoxide, etc.; typical alkenyl alicyclic sulfoxides include vinyl cyclopentyl sulfoxide, allyl cyclopentyl sulfoxide, etc.; typical diaryl sulfoxides include diphenyl sulfoxide, dibenzyl sulfoxide, di-p-tolyl sulfoxide, di-p-ethylbenzyl sulfoxide, etc.; typical alkyl aryl sulfoxides include methyl phenyl sulfoxide, methyl benzyl sulfoxide, ethyl phenyl sulfoxide, ethyl benzyl sulfoxide, etc.; typical alkenyl aryl sulfoxides include vinyl phenyl sulfoxide, vinyl benzyl sulfoxide, allyl phenyl sulfoxide, allyl benzyl sulfoxide, etc.; typical alicyclic aryl sulfoxides include cyclopentyl phenyl sulfoxide, cyclohexyl benzyl sulfoxide, etc. Of the above-mentioned substituted organic sulfoxides, dimethyl, diethyl and dipropyl sulfoxides are especially preferred as the sorption agents for recovering boron fluoride.

Also utilizable in the process of the present invention are cyclic sulfoxides wherein the $R_1$ and $R_2$ of the above general formula are linked together to form a heterocyclic ring are tetra-hydro-thiophene oxides (commonly called cyclotetramethylene sulfoxide):

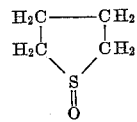

and a dihydro-1-thiophene oxide:

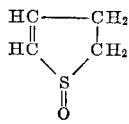

and their homologues wherein any one or more of their hydrogen atoms is replaced by a radical such as $R_1$, and $R_2$, said radicals having the same definition as hereinbefore set forth.

The process of this invention may be successfully applied to and utilized with many fluids and fluid mixtures. Suitable gases include such components as hydrogen, methane, ethane, propane, inert gases, etc., and mixtures thereof. Suitable parafins are normal butane, isobutane, normal pentane, isopentane, normal hexane, etc. Suitable cycloparaffins are cyclopentane, methylcyclopentane, cyclohexane, methylcyclohexane, and other alkyl cycloparaffins and mixtures thereof. Suitable aromatic hydrocarbons include benzene, toluene, and other alkyl benzenes and mixtures thereof. Preferred hydrocarbons utilized within the process of the present invention are monocyclic aromatic hydrocarbons, that is, benzene hydrocarbons. Higher molecular weight alkyl aromatic hydrocarbons are also suitable. These include those aromatic hydrocarbons such as are produced by the alkylation of aromatic hydrocarbons with olefin polymers and are used as intermediates in the preparation of sulfonate surface-active agents. Such products are frequently referred to in the art as alkylate, and include hexylbenzenes, nonylbenzenes, dodecyclbenzenes, pentadecylbenzenes, hexyltoluenes, nonyltoluenes, dodecyltoluenes, pentadecyltoluenes, etc., and mixtures thereof. Very often alkylate is obtained as a high boiling fraction in which the alkyl group attached to the aromatic nucleus varies in size from about $C_9$ to about $C_{18}$. Other suitable aromatic hydrocarbons, which at specified sorption conditions, depending upon the melting point of the compound chosen, would be in liquid form, would include hydrocarbons with two or more aryl groups such as diphenyl, diphenyl methane, and others. Examples of other aromatic hydrocarbons within the scope of this invention which at specified sorption conditions depending upon the melting point of the compound chosen, would be in liquid form, include those containing condensed aromatic rings. These include naphthalene, alkyl naphthalenes, anthracene, phenanthrene, naphthacene, rubrene, etc. Of the above-mentioned aromatic hydrocarbons that may be utilized in the process of the present invention, the benzene hydrocarbons are preferred, and of the preferred benzene hydrocarbons, benzene itself is particularly preferred.

In addition, the process of this invention may be successfully applied to and utilized with olefinic hydrocarbons. Suitable olefins include monoolefins containing one double bond per molecule and polyolefins which contain more than one double bond per molecule. Thus, suitable olefins include ethylene, propylene, 1-butene, 2-butene, isobutylene, and higher molecular weight normally liquid olefins such as the various pentenes, hexanes, heptenes, octenes and mixtures thereof, and still higher molecular weight liquid olefins, the latter including various olefin polymers having from about 9 to about 18 carbon atoms per molecule and including propylene trimer, propylene tetramer, propylene pentamer, etc., Cycloolefins such as cyclopentene, methylcyclopentene, cyclohexene, methylcyclohexene, etc., may also be utilized.

The process of this invention may be utilized when these hydrocarbons are present as mixtures in minor quantities in various gas streams. Thus, the normally gaseous hydrocarbon for use in the process of this invention need not be concentrated. Such normally gaseous hydrocarbons appear in minor quantities in various refinery gas streams, usually diluted with gases such as hydrogen, nitrogen, methane, etc. The boron halide content of the streams may be separated and recovered utilizing the process of the present invention.

In accordance with the process of the present invention, the separation and recovery of boron halide from a fluid mixture is effected by contacting said fluid mixture with a boron halide sorbent comprising a substituted organic sulfoxide in a sorption zone at sorption conditions including a temperature of from about $-50°$ or lower to about $+300°$ C. or higher, and preferably from about $10°$ C. to about $200°$ C., although the exact temperature needed will depend upon the particular fluid to be purified, the particular boron halide to be separated and recovered and the particular sulfoxide utilized. The sorption process is usually carried out at a pressure of from about atmospheric to about 200 atmospheres. The pressure utilized is usually selected to effect the desired selective sorption. The boron halide may then be subsequently desorbed from the sulfoxide in any suitable manner. This may comprise one or more of the following including (1) treating at moderate or elevated temperatures and superatmospheric pressure, atmospheric pressure or subatmospheric pressure, (2) treating the boron halide-sorbent complex with ammonia or amines to form boron halide-ammonia complexes which then are separated and decomposed with sulfuric acid, for example, or (3) by combining the boron halide-sorbent complex, and particularly the boron fluoride-sorbent complex, with metal halides such as, for example, calcium fluoride, lithium fluoride, silver fluoride, sodium fluoride, etc. to form fluoborates and by decomposing the latter at high temperatures with the liberation of boron fluoride. When other boron halides are used, the corresponding metal halide preferably is employed.

It is also contemplated within the scope of this invention that the hereinbefore mentioned organic sulfoxides may, if desired, be utilized in conjunction with water, and organic compounds such as the various alcohols, ketones, aldehydes, ethers, lower aliphatic acids, etc., although not necessarily with equivalent results, to improve the selectivity, solubility, stability and to lower the boiling temperature of the selected sulfoxide for use in the process of this invention.

In removing the hereinbefore mentioned boron halide from a fluid mixture with the type of sorption media herein described, either batch or continuous operations may be employed. Although the invention is particularly applicable to the separation and recovery of boron fluoride from fluid mixtures it may also be used for the separation of boron chloride or other boron halides from such mixtures when present alone or in admixture with boron fluoride. The actual operation of the process may be either upflow or downflow. The details and processes of this general character are familiar to those skilled in the art and any necessary addition or modifications of the above general procedures will be more or less obvious and can be made without departing from the broad scope of this invention.

The process of the present invention is illustrated by the following examples which are introduced for the purpose of illustration only with an intention of unduly limiting the generally broad scope of the invention.

*Example I*

A mixture of boron trifluoride dihydrate and benzene containing 190 p.p.m. (wt.) water was contacted with liquid dimethyl sulfoxide in a sorption zone maintained at a temperature of about 25° C. and at atmospheric pressure. The boron trifluoride hydrate was sorbed by the dimethyl sulfoxide resulting in about a 10° C. temperature increase. The formation of white solids was observed. The boron fluoride and benzene were subsequently separately recovered. The benzene recovered from the sorption zone showed substantial sorption had occurred as evidenced by negative analytical tests of the benzene for boron trifluoride.

Example II

A synthetic refinery off-gas containing 88% nitrogen and 12% boron trifluoride is contacted with liquid dimethyl sulfoxide in a sorption zone maintained at a temperature of about 75° C. and 10 atmospheres. The boron fluoride is sorbed by the dimethyl sulfoxide and the boron trifluoride and nitrogen are subsequently separately recovered. The nitrogen recovered from the sorption zone shows substantial sorption of the boron trifluoride occurring as evidenced by negative analytical tests of the nitrogen for boron trifluoride.

Example III

A mixture of boron fluoride and ethylbenzene containing about 50 p.p.m. (wt.) water is contacted with diethyl sulfoxide in a sorption zone maintained at a temperature of about 25° C. and atmospheric pressure. The boron fluoride is sorbed by the diethyl sulfoxide resulting in a small temperature increase. The boron fluoride and ethylbenzene are subsequently separately recovered. The ethylbenzene recovered from the sorption zone shows substantial sorption occurring as evidenced by negative analytical tests of the ethylbenzene for boron fluoride.

Example IV

A mixture of boron fluoride and toluene containing about 25 p.p.m. (wt.) water is contacted with dipropyl sulfoxide in a sorption zone maintained at a temperature of about 50° C. and atmospheric pressure. The boron fluoride is sorbed by the dipropyl sulfoxide resulting in a small temperature increase. The boron fluoride and toluene are subsequently separately recovered. The toluene recovered from the sorption zone shows substantial sorption of the boron trifluoride occurring as evidenced by negative analytical tests of the toluene for boron trifluoride.

Example V

Results similar to those obtained in Example I are obtained when methyl phenyl sulfoxide is substituted for dimethyl sulfoxide in the process described in Example I.

Example VI

Results similar to those obtained in Example II are obtained when a synthetic off-gas containing 90% ethylene and 10% boron fluoride is substituted for the synthetic off-gas in the process described in Example II utilizing as the boron fluoride sorbent dibenzyl sulfoxide.

I claim as my invention:

1. A process for the separation and recovery of boron fluoride from a fluid mixture containing the same which comprises contacting said fluid mixture with a hydrocarbyl substituted sulfoxide of the general formula

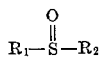

wherein $R_1$ and $R_2$ are each selected from the group consisting of alkyl, alkenyl, alicyclic and aryl at a temperature of from about −50° to about +300° C. and a pressure of from about atmospheric to about 200 atmospheres, thereby retaining at least a portion of said boron fluoride in said sulfoxide, and subsequently separating boron fluoride from said sulfoxide.

2. The process of claim 1 further characterized in that said sulfoxide is dimethyl sulfoxide.

3. The process of claim 1 further characterized in that said sulfoxide is diethyl sulfoxide.

4. The process of claim 1 further characterized in that said sulfoxide is dipropyl sulfoxide.

5. The process of claim 1 further characterized in that said sulfoxide is dibenzyl sulfoxide.

6. The process of claim 1 further characterized in that said sulfoxide is methyl phenyl sulfoxide.

7. A process for the separation of boron fluoride from a gaseous mixture containing the same which comprises contacting said gaseous mixture with a hydrocarbyl substituted sulfoxide of the general formula

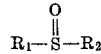

wherein $R_1$ and $R_2$ are each selected from the group consisting of alkyl, alkenyl, alicyclic and aryl, at a temperature of from about −50° to about +300° C. and a pressure of from about atmospheric to about 200 atmospheres.

8. A process for the separation of boron fluoride from a refinery off-gas containing the same which comprises contacting said off-gas with a hydrocarbyl substituted sulfoxide of the general formula

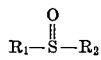

wherein $R_1$ and $R_2$ are each selected from the group consisting of alkyl, alkenyl, alicyclic and aryl, at a temperature of from about −50° to about +300° C. and a pressure of from about atmospheric to about 200 atmospheres.

9. A process for the separation of boron fluoride from ethylene containing the same which comprises contacting said ethylene with a hydrocarbyl substituted sulfoxide of the general formula

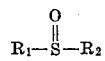

wherein $R_1$ and $R_2$ are each selected from the group consisting of alkyl, alkenyl, alicyclic and aryl at a temperature of from about −50° to about +300° C. and a pressure of from about atmospheric to about 200 atmospheres.

10. A process for the separation of boron fluoride from a liquid hydrocarbon mixture containing the same which comprises contacting said mixture with a hydrocarbyl substituted sulfoxide of the general formula

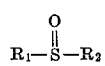

wherein $R_1$ and $R_2$ are each selected from the group consisting of alkyl, alkenyl, alicyclic and aryl, at a temperature of from about −50° to about +300° C. and a pressure of from about atmospheric to about 200 atmospheres.

11. A process for the separation of boron fluoride from an aromatic hydrocarbon containing the same which comprises contacting said aromatic hydrocarbon with a hydrocarbyl substituted sulfoxide of the general formula

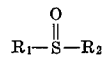

wherein $R_1$ and $R_2$ are each selected from the group consisting of alkyl, alkenyl, alicyclic and aryl, at a temperature of from about −50° to about +300° C. and a pressure of from about atmospheric to about 200 atmospheres.

12. A process for the separation of boron fluoride from benzene containing the same which comprises contacting said benzene with a hydrocarbyl substituted sulfoxide of the general formula

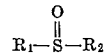

wherein $R_1$ and $R_2$ are each selected from the group consisting of alkyl, alkenyl, alicyclic and aryl, at a temperature of from about −50° to about +300° C. and a pressure of from about atmospheric to about 200 atmospheres.

13. A process for the separation of boron fluoride from ethylbenzene containing the same which comprises contacting said ethylbenzene with a hydrocarbyl substituted sulfoxide of the general formula

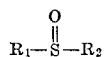

wherein $R_1$ and $R_2$ are each selected from the group consisting of alkyl, alkenyl, alicyclic and aryl, at a temperature of from about $-50°$ to about $+300°$ C. and a pressure of from about atmospheric to about 200 atmospheres.

14. A process for the separation of boron fluoride from a refinery off-gass containing the same which comprises contacting said off-gas with dimethyl sulfoxide, a temperature of from about $-50°$ to about $+300°$ C. and a pressure of from about atmospheric to about 200 atmospheres.

15. A process for the separation of boron fluoride from benzene containing the same which comprises contacting said benzene with dimethyl sulfoxide, at a temperature of from about $-50°$ to about $+300°$ C. and a pressure of from about atmospheric to about 200 atmospheres.

16. A process for the separation of a boron halide from a fluid mixture containing the same, which comprises contacting said fluid mixture with a hydrocarbyl substituted sulfoxide of the general formula

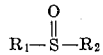

wherein $R_1$ and $R_2$ are each selected from the group consisting of alkyl, alkenyl, alicyclic and aryl at conditions to retain at least a portion of the boron halide in the sulfoxide.

17. A process for the separation of boron fluoride from a fluid mixture containing the same, which comprises contacting said fluid mixture with a hydrocarbyl substituted sulfoxide of the general formula

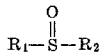

wherein $R_1$ and $R_2$ are each selected from the group consisting of alkyl, alkenyl, alicyclic and aryl at conditions to retain at least a portion of the boron fluoride in the sulfoxide.

References Cited by the Examiner
UNITED STATES PATENTS 2,378,968  6/1945  Axe _____ 23—205

MAURICE A. BRINDISI, *Primary Examiner.*